United States Patent [19]  
James

[11] 3,914,014  
[45] Oct. 21, 1975

[54] CONNECTOR ASSEMBLY FOR A BOTTOM-DRAG SEISMIC CABLE

[75] Inventor: Harlan A. James, Houston, Tex.

[73] Assignee: Western Geophysical Company of America, Houston, Tex.

[22] Filed: Aug. 23, 1974

[21] Appl. No.: 499,867

[52] U.S. Cl............. 339/104; 174/21 R; 174/88 R; 339/148
[51] Int. Cl.² ........................................ H01R 13/58
[58] Field of Search......... 174/84 R, 84 S, 93, 88 R, 174/88 S, 21 R, 101.5; 339/104, 103 R, 148, 150 R, 150 L, 151 R, 151 C

[56] References Cited
UNITED STATES PATENTS 1,044,108  11/1912  Warren .......................... 174/88 R
3,544,700  12/1970  Priaroggia .................. 174/21 R X Primary Examiner—Granville Y. Custer, Jr.
Assistant Examiner—DeWalden W. Jones
Attorney, Agent, or Firm—Michael P. Breston

[57] ABSTRACT

A connector assembly for splicing two sections of a multiconductor seismic drag cable. The assembly consists of threaded stress-member extension pins that are swaged to the central stress members of the cable sections that are to be joined. Union couplings, interconnected by a flexible stress section, are screwed to the threaded extension pins, thereby mechanically joining the cable sections. The extension pins are surrounded by perforated bulkheads. Corresponding conductors from each multiconductor cable are inserted through the perforations and are electrically interconnected by suitable plug means. The entire assembly is enclosed by a sealed, kerosenefilled, flexible boot.

7 Claims, 11 Drawing Figures

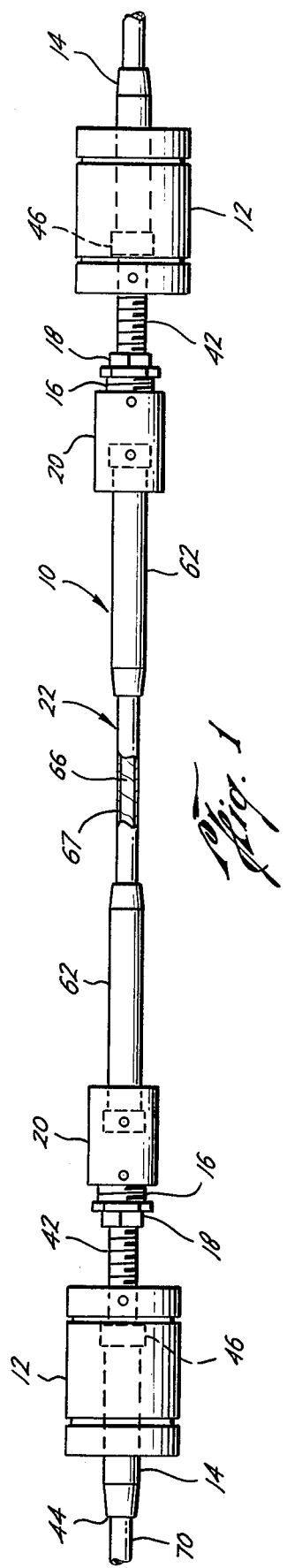
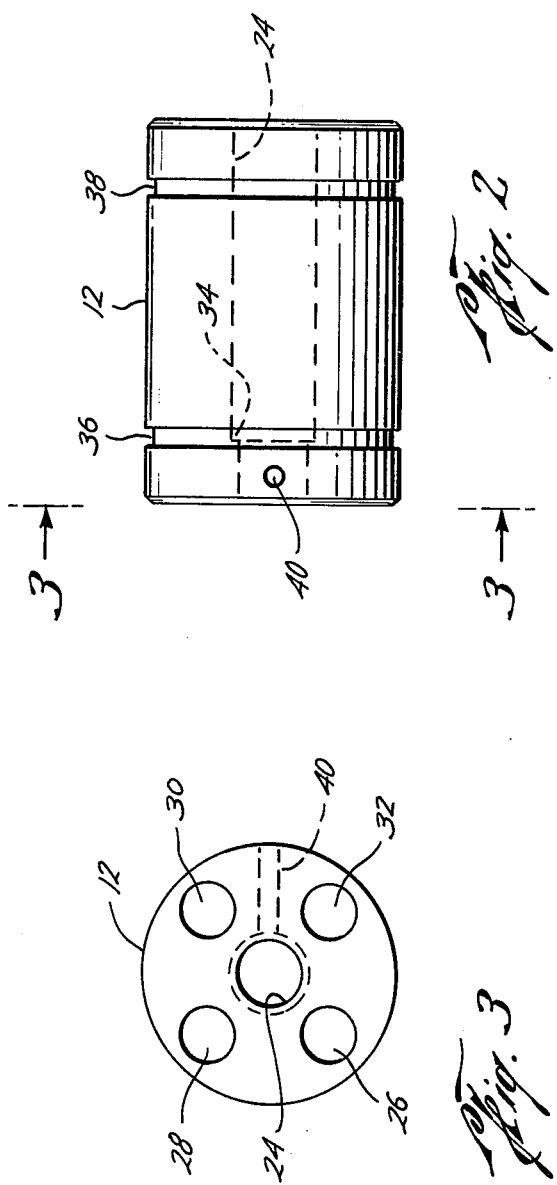
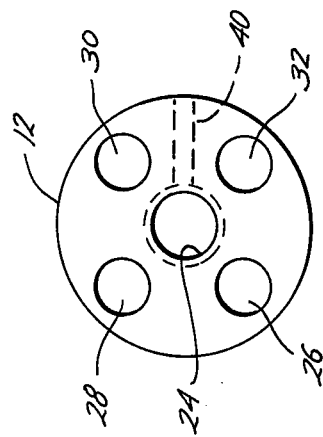

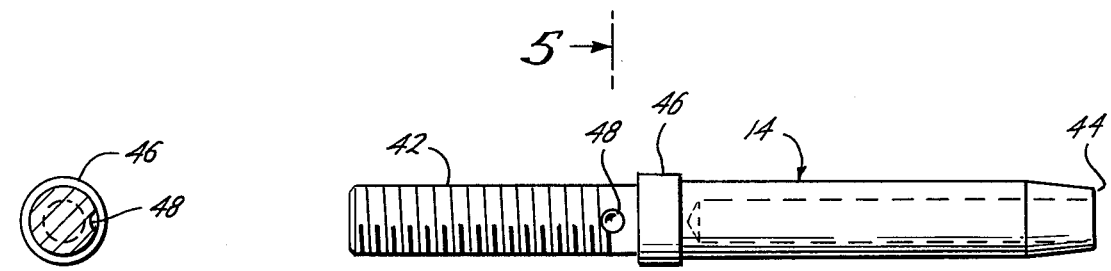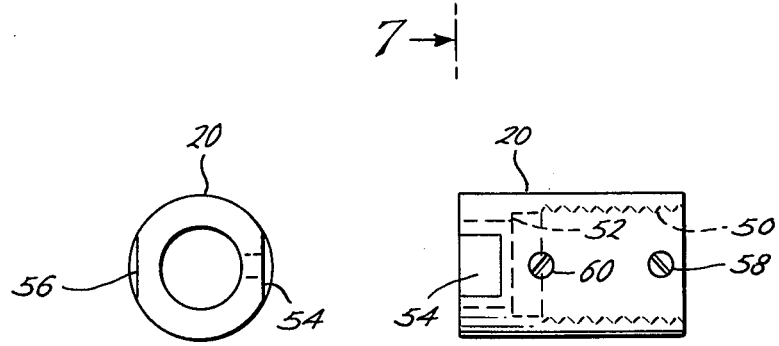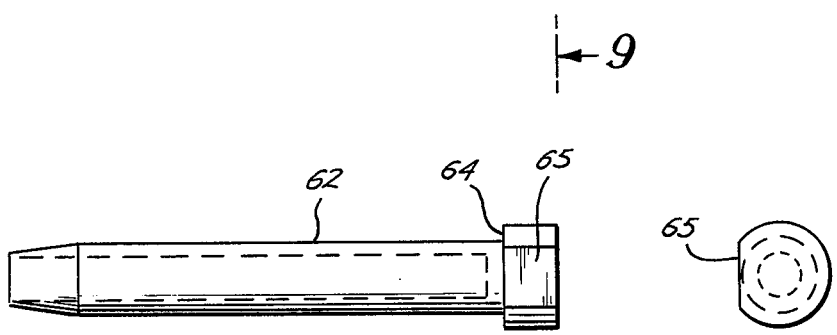

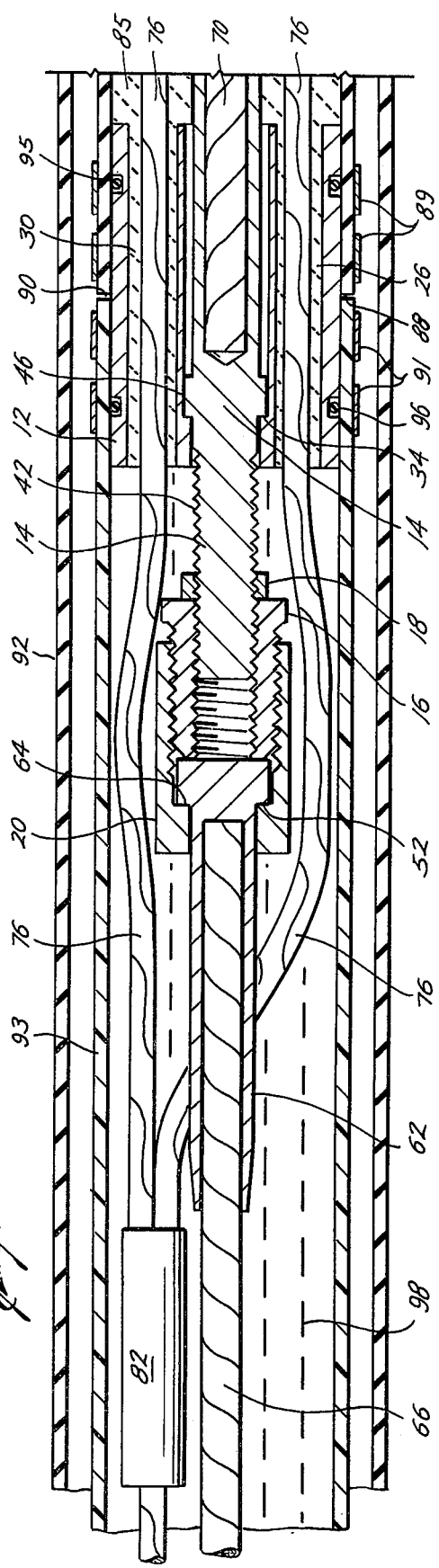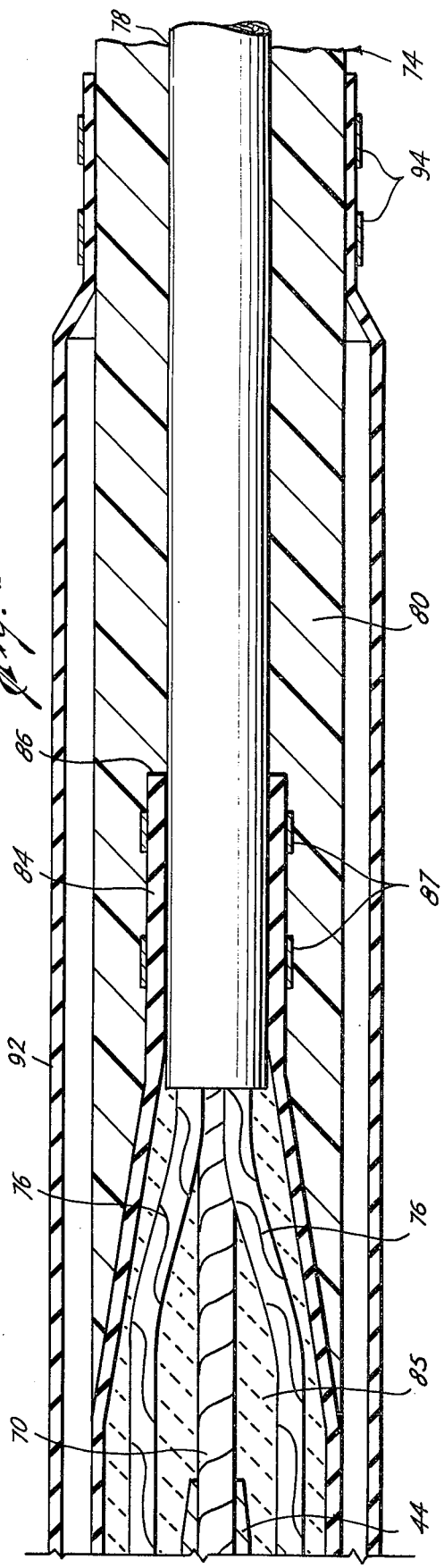

CONNECTOR ASSEMBLY FOR A BOTTOM-DRAG SEISMIC CABLE

BACKGROUND OF THE INVENTION

In shallow water seismic surveying, seismic signals are detected by hydrophones mounted on a bottom drag cable. The drag cable is coupled to a lead-in cable tied to a towing ship. In operation, the ship tows the drag cable just above the sea floor along a prescribed line of survey.

The drag cable, which may be 2000 feet or more long, consists of a central stress member surrounded by a plurality of conductor pairs. Connected to a corresponding plurality of hydrophone groups, the conductor pairs transmit the hydrophone signals to a recording device on the towing ship. For protection from abrasion and salt water corrosion, the stress member and conductors are enclosed in a plastic sheath.

Ordinarily, it is preferable to tow the drag cable two or three feet above the sea floor to prevent snagging. To this end, the cable is provided with a cellular polyethylene covering one or two inches thick. The cellular material imparts positive buoyancy to the cable. The cable is held at the desired distance above the sea floor by attaching one end of short lengths of chain to the cable at suitable intervals. The cable's level of elevation is controlled by the weight and length of the attached chains, which act as a counterbalance against the buoyancy of the cable. Providing compensation for buoyancy, the suspended portion of the chains, as well as the portion laying on the sea floor, stabilize the cable at the desired elevation.

The forward end of the drag calbe is coupled to the trailing end of the lead-in cable by a bell-and-nut coupling. The coupling is a type of union fitting consisting of two parts: a bell portion attached to the lead-in cable and a ring nut portion attached to the drag cable.

In use, the stress member of the drag cable is inserted through a hole into one end of the ring-nut portion of the coupling and is held in place by a button stop or other suitable anchor. The conductors are inserted through additional holes in the fitting. By use of a suitable potting compound, stress member and conductors are sealed inside the housing in a manner such that the conductors project beyond the surface of the potting compound, thus providing availability for subsequent electrical connection. The neoprene jacket and cellular polyethylene covering are then injection-molded to one end of the ring-nut portion of the coupling. The entire process of potting and injection molding is done at the factory.

The lead-in cable is anchored and molded to the bell portion of the coupling in a similar manner. After electrically interconnecting corresponding conductors of the drag cable and the lead-in cable, the two portions of the coupling are fastened together by screwing the ring nut tightly against the mating bell housing.

Although the coupling device as above described has been in use for many years, it suffers from two main problems.

Made of naval bronze, the coupling must be very massive to provide mechanical strength against towing stresses. It is therefore very heavy and plummets to the bottom. It is necessary to support the coupling by means of a special external float which is awkward to handle and creates noise when the cable is under tow.

If either the lead-in or the drag cable becomes damaged, the entire cable including the coupling must be replaced. To make a water-tight field repair is very difficult since injection-molding equipment is not available on seismic towing ships.

It is the purpose of this invention to provide an inexpensive, buoyant, field-repairable cable-connector assembly to splice together two or more cable sections of a seismic drag cable.

SUMMARY OF THE INVENTION

The connector assembly includes two perforated bulkheads secured at the opposing ends of two, spaced-apart drag cable sections. The bulkheads have a central perforation and a plurality of annular perforations. Threaded stress-member extension pins extend through the bulkheads and are swaged to the stress members of the cable sections. There is provided an elongate stress section having a flange on each end. Two internally threaded collars, having limited sliding movement, are mounted on the stress section with the internal threads facing in opposing directions. The threaded collars have an internal shoulder adapted to mate with the flanges at each end of the stress section. The stress members of the two spaced-apart cable sections are mechanically joined by screwing the collars to the threaded end of the stress-member extension pins.

Corresponding electrical conductor pairs are inserted through the annular perforations in the opposite bulkheads. Encircling the stress section, the conductors may be interconnected by any suitable means.

A tubular, elongate boot to enclose the connector assembly and conductors is sealed to a first portion of the bulkheads. The boot is filled with an insulating fluid lighter than water to provide the connector assembly with positive buoyancy.

Tubular tapered boots are sealed to a second portion of the bulkheads and to the insulating jacket of the drag cable sections to provide a water-tight seal.

BREIF DESCRIPTION OF THE DRAWINGS

FIG. 1 is an overall view of the connector assembly;
FIG. 2 is a side view of a bulkhead;
FIG. 3 is an end view of the bulkhead on line 3—3;
FIG. 4 is a side view of the stress member extension pin;
FIG. 5 is a sectional view on line 5—5 in FIG. 4;
FIG. 6 is a side view of the internally threaded collar;
FIG. 7 is a view on line 7—7 in FIG. 6;
FIG. 8 is a side view of the flanged swage fitting;
FIG. 9 is an end view on line 9—9 in FIG. 8;
FIGS. 10A and 10B are sectional views of the connector shown attached to a cable section.

DETAILED DESCRIPTION OF INVENTION

Referring now to FIG. 1, the connector assembly 10 includes perforated bulkheads 12, threaded stress-member extension pins 14, sleeve nuts 16, lock nuts 18, internally threaded collars 20, and elongate stress section 22.

In FIGS. 2 and 3, each bulkhead 12 defines a central perforation 24 and a plurality of symmetrically arranged annular perforations 26, 28, 30 and 32. Central perforation 24 is provided with an internal shoulder 34. Bulkhead 12 has two O-ring slots 36, 38 and a set screw 40.

Stress-member extension pin 14 shown in FIGS. 4 and 5 has a threaded end 42 and a hollow end 44. The internal diameter of hollow end 44 is sufficient to receive the stress member 70 (FIG. 1) of a drag cable section. An enlarged upset 46 separates the hollow end 44 of extension pin 14 from threaded end 42. Upset 46 is designed to seat against shoulder 34 of bulkhead 12 when pin 14 is inserted through central perforation 24 of the bulkhead. A detent 48 is provided to receive a set screw to secure bulkhead 12 to extension pin 14.

Collar 20 shown in FIGS. 6 and 7 is provided with an internal thread 50 and an internal shoulder 52. Flat surfaces 54 and 56 are milled on opposite sides of collar 20 to receive the jaws of a wrench. Two set screws 58 and 60 are provided to lock collar 20 after assembly.

Stress section 22 (FIG. 1) consists of a length of cable 66 and two swage fittings 62 (FIGS. 8, 9), each having a flange 64 on one end, and a flat surface 65. Cable 66 may be made of stainless steel with a plastic covering 67 and is on the order of a foot long and ⅜ inch in diameter. The dimensions are not critical, except that the diameter of cable 66 must equal or exceed the diameter of the stress member in the drag cable sections. In assembly, stress section 22 is assembled by swaging a first swage fitting 62 to cable 66. Next, collars 20 are slipped over the cable with the internal threads 50 (FIG. 6) of collars 20 facing in opposite directions and outwardly with respect to the end of the length of cable 66. The second fitting 62 is then swaged over cable 66. Collars 20 are thereby mounted for limited sliding movement on each end of the elongate stress section 22. Flanges 64 on the end of fittings 62, seat against the internal shoulders 52 in collars 20.

Referring now to FIGS. 10A and 10B, one end of a first drag cable section and the right-hand portion of the connector assembly are shown in cross section. A second drag cable section, secured to the left-hand portion of the connector assembly is not shown to simplify the drawing.

The drag cable section 74 (one end of which is shown) consists of stress member 70, conductors 76, insulating jacket 78, and a covering layer of cellular float material 80. A short length of the stress member 70 of one end of cable section 74 is exposed. Hollow end 44 of stress member extension pin 14 is swaged to stress member 70. Bulkhead 12 is slipped over pin 14 until shoulder 34 engages upset 46 of pin 14. Bulkhead 12 is then secured in place by tightening set screw 40 against detent 48 of pin 14 (FIGS. 4, 5). Lock nut 18 and a sleeve nut 16, which has internal and external threads, are screwed over threaded end 42 of pin 14. Collar 20 is screwed over sleeve nut 16 until flange 64 of swage fitting 62 is seated firmly against shoulder 52 at the base of collar 20. Lock nut 18 is then tightened against sleeve nut 16 to prevent the sleeve nut from turning. Set screws 58 and 60 (FIG. 6) in collar 20 are respectively tightened against flat face 65 of fitting 62 (FIG. 8) and against sleeve nut 16.

After stress member extension pin 14 has been swaged over stress member 70, and the connector assembly has been assembled as described above, conductors 76 are inserted through annular perforations 26–30 of bulkhead 12. The conductors are interconnected with corresponding conductors from a second cable section (not shown) by a connector 82 of any well-known type. A tapered boot 84 of suitable plastic material is mounted over the conductors and stress member. The smaller end 86 sealingly engages insulating jacket 78 and the larger end 88 fits over a first portion of bulkhead 12. The void within tapered boot 84 may be filled with a potting compound 85 of any well-known type to seal conductors 76 from fluid invasion through annular perforations 26-30 of bulkhead 12. Ends 86 and 88 of tapered boot 84 are secured in place by band fasteners 87 and 89, such as "punch-lok" bands, to provide a watertight seal. The cellular float material 80 which may be a plastic such as polyethylene, is trimmed to fit over tapered boot 84 to form a flush cylindrical surface.

The end 90 of an elongate tubular plastic boot 93, which may be polyvinyl chloride, is sealed over a second portion of bulkhead 12 by band fasteners 91. O-rings 95 and 96 provide additional sealing at the ends of tubular boot 93 and tapered boot 84. Tubular boot 93 encloses the entire connector assembly to prevent water invasion. The void space 98 within tubular boot 93 is filled with an insulating fluid. The fluid must have a specific gravity less than that of water, to render the connector assembly positively buoyant. The fluid may be an aliphatic hydrocarbon of any well-known type such as Noroma. For mechanical protection against abrasion, the tubular boot 93, as well as a short length of the drag-cable section 74, is enclosed within a length of reinforced hose 92 of any well-known type. Hose 92 is secured in place by band fasteners 94.

While the invention was illustrated relative to a specific embodiment, it is not intended to be limited thereto.

What I claim is:

1. A connector assembly for joining two drag-cable sections, each cable section including a central stress member, a plurality of conductors surrounding said stress member, an insulating waterproof jacket enclosing said stress member and said plurality of conductors, and a bouyant cellular plastic covering surrounding said jacket, the assembly comprising:
   a pair of perforated bulkhead members securable to each of the opposing ends of two, spaced-apart cable sections;
   a pair of stress-member extension pins having a hollow end portion and an externally-threaded end portion, removably mounted to extend through the center of each bulkhead member;
   an elongate stress section; and
   a pair of union means coupling said stress section to said extension pins.

2. A connector assembly for joining two drag-cable sections, each cable section including a central stress member, a plurality of conductors surrounding said stress member, an insulating waterproof jacket enclosing said stress member and said plurality of conductors, and a bouyant cellular plastic covering surrounding said jacket, the assembly comprising:
   a pair of perforated bulkhead members securable to each of the opposing ends of two, spaced-apart cable sections;
   a pair stress-member extension pins each having a hollow end portion and an externally-threaded end portion, removably mounted to extend through the center of each bulkhead member;
   a pair of sleeve nuts each having inner and outer threads, mounted on the threaded end portion of each of the stress-member extension pins;

a pair of locknuts on the threaded portion of the extension pins for locking the sleeve nuts in place on the threaded end portions of the extension pins;
an elongate stress section; and
a pair of hollow, internally-threaded collar members mounted for limited sliding movement on each end of said elongate stress section, said collar members being arranged to threadably engage the external threads of said sleeve nuts.

3. The connector assembly of claim 2 wherein:
the hollow end of each stress-member extension pin is adapted to swagingly engage the stress member of each of said drag cable sections.

4. The connector assembly of claim 3 wherein:
each bulkhead has a central perforation to receive said stress-member extension pin and a plurality of annular perforations through which protrude the conductors of said spaced-apart multi-conductor drag cable section; and
means to detachably interconnect corresponding conductors between the multiconductor drag cable sections.

5. The connector assembly of claim 4 wherein:
each internally threaded collar member is provided with an internal retaining shoulder at one end thereof; and
each end of said elongate stress section is provided with a flange to seat against the internal retaining shoulder of said collar members.

6. The connector assembly of claim 5, and including:
an elongate tubular boot member secured around a first portion of said bulkhead members and enclosing the connector assembly, said boot being filled with an insulating fluid having a specific gravity less than that of water to impart positive buoyancy to said connector assembly.

7. The connector assembly of claim 6, and including;
a pair of tapered hollow boot members fastened in sealing engagement to second portions of said bulkhead members and to the insulating waterproof jackets of said drag cable sections.

* * * * *